Figure 1:
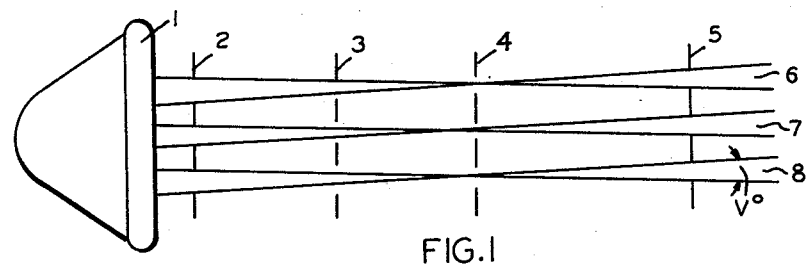

Nov. 17, 1964  E. PARSBERG  3,157,363
RANGING BEAM BEACON

Filed Sept. 30, 1960  3 Sheets-Sheet 1

INVENTOR
ERIK PARSBERG

BY *Larson & Taylor*
ATTORNEYS

Nov. 17, 1964  E. PARSBERG  3,157,363
RANGING BEAM BEACON
Filed Sept. 30, 1960  3 Sheets-Sheet 2

INVENTOR
ERIK PARSBERG
BY *Larson & Taylor*
ATTORNEYS

United States Patent Office 3,157,363
Patented Nov. 17, 1964

3,157,363
RANGING BEAM BEACON
Erik Parsberg, Stockholm, Sweden, assignor to Svenska Aktiebolaget Gasaccumulator, Lidingo, Sweden, a corporation of Sweden
Filed Sept. 30, 1960, Ser. No. 59,555
Claims priority, application Sweden Nov. 5, 1959
4 Claims. (Cl. 240—46.1)

The present invention relates to a ranging beam beacon which is adapted to emit within a definite sector, the ranging sector, a narrow and sharply defined ranging beam. The ranging sector may be surrounded on one or both sides by lateral sectors which may differ from the ranging sector with respect to their light character, for instance by emitting coloured light.

Such ranging beam beacons can be employed where the area of safe navigation is restricted, for instance owing to the presence of submerged obstructions or in narrow passages or channels. According to the circumstances, the ranging sector may comprise angle of the order of 0.5° up to about 5°.

In order to provide a light beam which exhibits this high degree of sharpness on one or both sides, it is possible to employ screening plates which are placed in the direction of the beam or slotted plates which are placed at right angles to the beam direction. The ratio of slot width to the length of the screening in the beam direction is selected so as to provide the desired sharp transition and also in such a way that the angular distance in radians from full light strength to zero light strength is approximately equal to the said ratio of slot width to length.

A light beam obtained in this manner has the disadvantage that maximum light strength is present only along the line of symmetry, the light strength decreasing linearly towards the boundary line of zero light. In some applications, however, it is desirable to have a light strength of a more constant value over the whole sector at the same time as the transition sharpness should be large. This result can be obtained through the present invention.

According to the invention, the desired light distribution within a sector is obtained through a subdivision of each section into a plurality of light channels, the light channels exhibiting a mutual angular displacement such as to result in a desired light distribution within the sector. Preferably, adjoining light channels have a mutual displacement equal to half the angle of divergence of a light channel. If the subdivision into channels is selected in such a way as to provide a high degree of transition sharpness at the sector boundary only within the areas where different-colour sectors have a common boundary, a smaller number of channels can be used to obtain the desired sharpness and width with a constant light strength.

In order to make it possible to obtain with the same arrangement a ranging sector the angle of which is adapted to the prevailing conditions at the actual location of the ranging beam beacon, the ranging sector may be subdivided into channels in such a way that the central portion of the ranging sector is of variable width, or the degree of overlapping between a relatively broad middle portion of the ranging sector and the lateral channels thereof may be made variable.

Figures 6, 7, 8, 9:
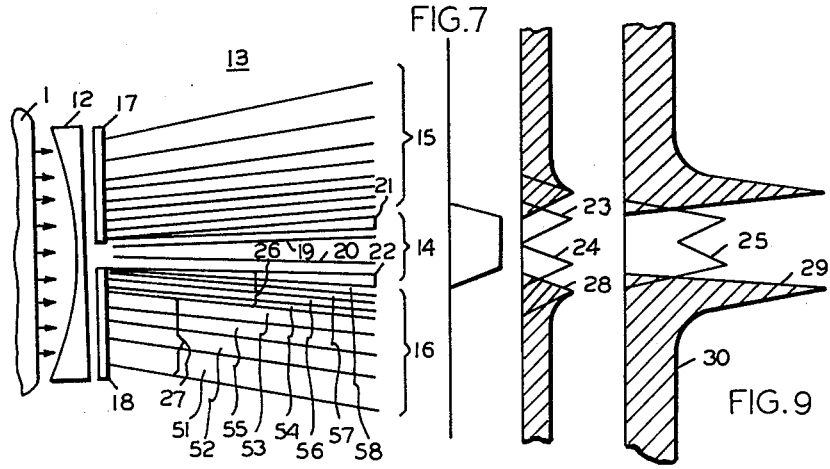

The invention will be described in more detail with reference to the annexed drawing, FIG. 1 of which shows a schematic diagram of a ranging beam beacon of my prior art as shown in my copending application Serial No. 853,417, in which the light within a sector is subdivided into a number of parallel channels. FIGS. 2, 3, 4 and 5 indicate the light distribution pattern which is obtained by superposition of the light from different light channels. FIG. 6 shows a schematic diagram of a possible embodiment of the invention of a ranging beam beacon with a ranging sector surrounded by a pair of lateral sectors, and FIGS. 7, 8 and 9 illustrate the light distribution within different sectors of this beacon.

Figure 10:
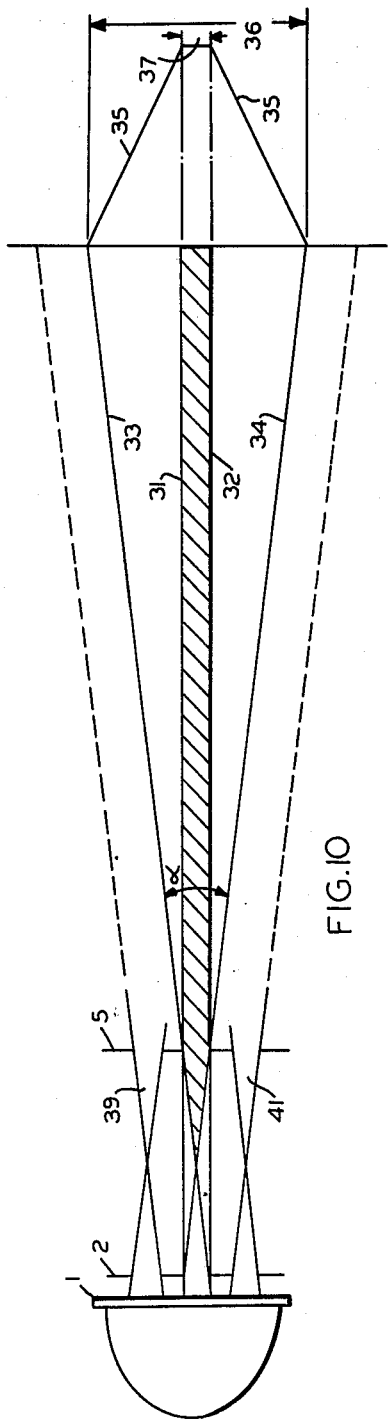
Figure 11:
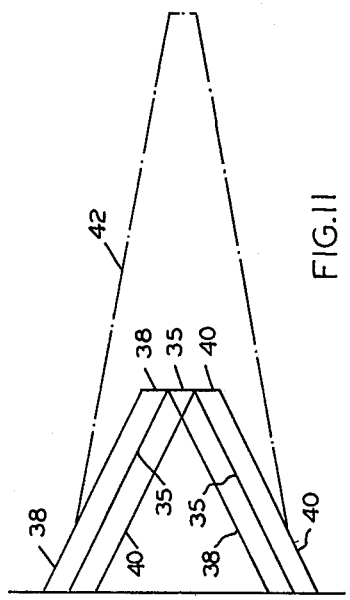
Figure 12:
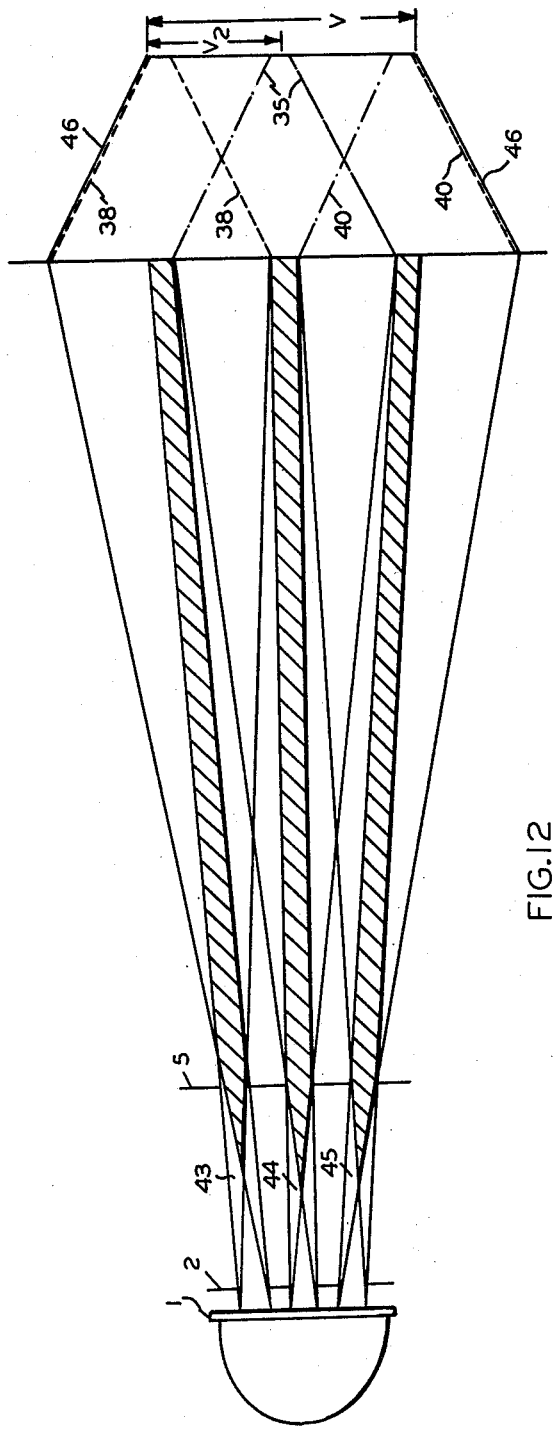

FIGS. 10–12 show more specifically the schematic arrangements of FIGS. 2–5.

The beacon shown in FIG. 1 is assumed for simplicity to emit light within only one sector, the light within this sector being composed of the light from three light channels. The beacon comprises a light source 1 which is adapted to emit substantially parallel light. For subdividing the light into the different light channels, there are used in the present instance a number of screens 2, 3, 4 and 5 placed after each other in the direction of the light beam. The screens 2 and 5 cooperate to define the sector angle, whereas the screens 3 and 4 are intended to screen off a light that would be emitted through non-opposing or correspondingly disposed apertures of the screens 2 and 5.

Figure 2:
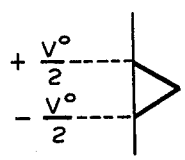
Figure 3:
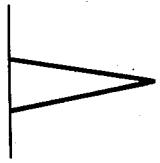

Assuming that the light emitted from the light source 1 is of constant density over the whole of the effective area, the light distribution pattern within one of the light channels 6, 7 or 8 would be such as indicated in FIG. 2. As shown, the light strength will drop off practically linearly from a maximum value in the line of symmetry of the light channel down to zero at the lateral boundaries of the light channel in question. If all of the light channels of a sector are arranged to be exactly parallel, the light distribution within this sector will be as shown in FIG. 3. From this figure, it is apparent that under the assumed conditions the light strength will exhibit a marked maximum in the line of symmetry of the sector at the same time as it will drop to zero at the sector boundaries. This type of distribution pattern may not be desirable, for instance when a ranging sector is bounded on one or both sides by lateral sectors of different colours. If then the light strength of a sector approaches zero at the sector boundary and has its maximum value only in the line of symmetry thereof, it may be difficult when navigating with the aid of the sector beacon, to establish swiftly and positively the position of the sector boundaries.

Figures 4, 5:
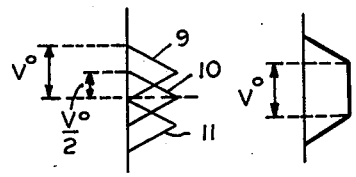

In order to provide for a more suitable light-distribution pattern within a sector, according to the invention, there is an angular displacement between the light channels 27 of the sector 16 of (FIG. 6) with regard to each other, whereby a certain widening of the area of maximum light strength is obtained. On the attached drawings, FIGS. 4 and 5 show how this superposition of the different light channels is obtained. In FIG. 4, the curves 9, 10 and 11 show the light distribution within each of the channels 6, 7 and 8 on the assumption that the light distribution within each individual channel is of the substantially triangular type already referred to. If, as shown in FIG. 1, the angle of divergence of one of the light channels is designated $v°$ it is apparent from FIG. 4 that the angular displacement in this instance is equal to half the angle of divergence of one of the light channels. Consequently, the light distribution within the sector in question for a normal viewing distance will be according to the curve of FIG. 5. It is apparent from this that the beacon has a maximum light strength of constant value within an angle of $v°$ and that the light strength drops outside of this angular area.

FIG. 6 indicates how a ranging beam beacon with a ranging sector surrounded by a pair of lateral sectors can be constructed in accordance with the principles of the invention as above indicated. The beacon is assumed to comprise a light source 1, which in this case also is adapted to emit substantially parallel light. In order for this light to exhibit a divergence corresponding to the angle of divergence of all of the three sectors of the beacon, a light diverging element in the form of a negative cylinder lens or prisms 12 is inserted between the light source 1 and the screening device 13. In this embodiment of the invention, the screening device is composed of screens which extend in the direction of the light instead of perpendicularly thereto, as was the case in the FIG. 1 arrangement. The ranging sector 14 of the beacon is adapted to emit white light, whereas the lateral sectors 15 and 16 are provided with coloured plates 17 and 18, respectively, so that for instance, green and red light, respectively, is obtained in the lateral sectors. The ranging sector is composed of three light channels, the middle channel being formed by light passing between the screens 19 and 20, which diverge away from the light source 1. As a consequence, the light distribution within this middle channel of the ranging sector will be of the type indicated in FIG. 7. The two lateral light channels of the ranging sector are formed by light passing between the screens 19 and 20, respectively, and the screens 21 and 22, which form the boundaries of the corresponding lateral sectors. The screens of these lateral light channels of the ranging sector are parallel, so that the light distribution for these channels is in accordance with the curves 23 and 24 of FIG. 8. Through a superposition of the light from all the three light channels of the ranging sector, there is obtained within this sector a light distribution according to the curve 25 of FIG. 9. As is apparent from this curve, the light strength exhibits a marked maximum in the vicinity of the desired sector boundary, which highly facilitates the establishing of the sector boundaries when the beacon is used for navigation.

The two lateral sectors 15 and 16 are of similar construction and only one of them will be described in the following. In the embodiment shown, the light for the lateral sector 16 is derived from eight light channels 51, 52, 53, 54, 55, 56, 57, 58. Of these, the four light channels 26 nearest to the ranging sector comprise mutually parallel screening plates, whereas the outer light channels 27 comprise screening plates which diverge away from the light source 1. Each of the four light channels of the group 26 has a light distribution pattern according to the curve 28 of FIG. 8, which is of substantially the same form as the curves 23 and 24. Since the light channels of the group 26 are mutually parallel, the light from these four light channels is superimposed in the way shown in FIG. 3, so that there is obtained a light strength and a light distribution pattern according to the curve 29 of FIG. 9 showing a marked maximum light strength in the vicinity of the sector boundary screen 22. Maximum intensity according to this curve 29 is thus four times the maximum light intensity according to the curve 28, but owing to the absorption of a substantial part of the visible light in the colour filters, the light leaving the light channels of the group 26 will be appreciated by the viewer as being of approximately the same strength as the light of the ranging sector. The screening plates of the light channels of the group 27 are diverging in the direction of the light rays, as was mentioned above. This results in a mutual angular displacement between these light channels, so that a superposition of their light according to the principle shown in FIGS. 4 and 5 is obtained. The light from these channels will therefore be largely in accordance with the curve 30 of FIG. 9. This light will therefore be appreciated by the viewer as of lower intensity than the light of the ranging beam but will instead comprise a larger angular area, which is desirable in many applications.

As is apparent from the above, the screening device 13 has for its chief purpose to prevent the light of the ranging sector from becoming visible in any of the lateral sectors or the light of any of the lateral sectors from becoming visible within the ranging sector. On the other hand, it is rarely required that the light of a lateral sector shall not spread outside a certain angle measured from the lateral sector. On the contrary, this may be desirable in some cases. In order to widen a lateral sector in this way, screening plates for this lateral sector may be non-reflective on the inside facing the lateral sector and reflective on the outside facing away from the lateral sector.

As is apparent from the above, the angle of divergence of a light channel is determined by the ratio of slot width to screening length for this channel. If it should be desirable in a particular case to have a larger or a smaller angle of divergence, it is thus possible to obtain this either through a corresponding dimensioning of the slot width or of the length of the screening device. Furthermore, it may be suitable, particularly with regard to the light channels composing the ranging beam, to choose a construction by which small variation of the angle of the ranging sector does not lead to any appreciable change in the light distribution within the ranging sector.

In FIG. 10 there is shown the light source 1 which emits a beam of practically and substantially parallel light-rays. In FIG. 10 only the two representative screens 2 and 5 have been shown, since these screens define the angle of the central light channel shown in detail in FIG. 10. It is supposed that the light channels surrounding this central light channel are parallel with the central channel and have the same angle of light spread. As it has been stated above, the angle $\alpha$ might be in the order of 0.5° up to about 5°.

From FIG. 10 it is obvious that the light intensity is generally constant between the parallel lines 31 and 32, since a person situated at a point A between these two lines always can see an area of the light source 1 of the same size. Outside these two parallel lines 31 and 32, the person can see a still smaller area of the light-source 1 when he moves in any direction towards the divergent lines 33 and 34. It is obvious that at the lines 33 and 34 the light intensity equals zero, and, accordingly, the variation of the light intensity over the light channel is indicated by the almost triangular curve 35.

It should be noted that the beacon according to the invention is intended to be viewed from a rather large, extended distance, such as at least a mile, and in such case the distance 36 within which the central channel can be seen is in the order of 30 meters, if the angle $\alpha$ is supposed to be about 1°. However, the distance 37 which indicates that part of the light channel within which the light intensity is constant is still only about 1 cm. That means that the curve 35 can be regarded as a practically triangular curve, as has been shown in FIG. 2.

The result as to the light intensity over one sector when the light is composed by the light from a number of light channels is shown in FIG. 11. The curve 35 shows the light intensity within the central channel at a very short distance from the beacon, while the curve 38 indicates the light intensity within the upper light channel 39 and the curve 40 indicates the light intensity within the lower light channel 41. At a normal viewing distance these three curves 35, 38 and 40 can be regarded as triangular curves. By a simple superposition of these three curves, the curve 42 is obtained which indicates the light intensity within the total sector. It can be seen that the maximum light intensity in the middle of the light sector is about three times the light intensity of each one of the light channels. It is further obvious that this curve 42 will have a practically triangular shape as also has been indicated in FIG. 3.

Since the light distribution according to the curve 42 has certain apparent disadvantages, the light channels have been arranged in the way shown in FIG. 12. In accordance with FIG. 12 there is a certain angle between the different light channels 43, 44 and 45, and the spread between the different channels is in this embodiment chosen in such a way that the angle between the light channels $v/2$ is half the light spread $v$ of each one of the light channels. By superposition of the three curves 35, 38 and 40, the curve 46 is obtained which shows that the constant maximum light intensity is obtained over the angle v. Furthermore, it is seen that the maximum light intensity according to the curve 46 equals the maximum light intensity of any one of the curves 35, 38 and 40. As has been stated above, a light distribution of this kind is more advantageous than the light distribution according to FIG. 11. It is obvious that the part of the sector shown in FIG. 12 within which the light intensity has its constant maximum value can be made larger with respect to the total sector angle if only the number of light channels is made greater.

What is claimed is:

1. Ranging beam beacon comprising a light source for emitting substantially parallel light rays, a light diverging element, a plurality of plane screening members having their length dimension disposed in the direction of said light rays, said plurality including a group of adjacent screening members disposed in a mutual parallel arrangement and further including a collection of adjacent screening members disposed in a mutual diverging arrangement and in said direction of the light rays, the light passing between any two adjacent of said screening members forming one light channel, the angle of the light cone passed through said channels formed by said collection of screening members being determined by a ratio of the spacing between said two screening members and the length of said two screening members in said direction of the light rays, the axis of one light channel formed by said collection of screening members differing from parallelism with an adjacent light channel of said collection by an angle equal to one-half of said angle of said light cone passed through said channel, and said channels formed by said group superimposing the light passing therethrough so that there is obtained a light strength and a light distribution pattern showing a marked maximum light strength in the vicinity of the boundary between said group and said collection of screening members for forming a ranging beam.

2. A ranging beam beacon as claimed in claim 1, in which the light channels exhibit a characteristic drop in light intensity on one portion more than on another.

3. A ranging beam beacon as claimed in claim 2 in which the channels are bounded by screening members placed in a beam direction, the screening members having reflected surfaces facing away from the ranging beam and non-reflective surfaces facing the ranging beam.

4. Ranging light beacon comprising a source producing the emission of only substantially parallel light, an inner screen spaced from said light source disposed in said light and arranged generally perpendicularly to said parallel emission, a farthermost screen lying in a plane generally parallel with said inner screen and disposed in said light, a screen spaced intermediate the other screens and disposed in said light and lying in a plane generally parallel with one of the other screens, each of said screens having a plurality of spaced, parallel and elongated apertures disposed across the screens, said apertures of the inner screen corresponding in size with opposed apertures of the farthermost and intermediate screens, each of said apertures of said inner screen defining in cooperation with corresponding apertures of said farthermost screen, light channels each having an axis determined by the midpoints of said corresponding apertures, said screens having said axis of said apertures forming one light channel differing from parallelism with the axis of the said apertures forming the adjacent light channel by an angle divergent from said source, said angle being defined as equal to one-half of the angle of the light cone of each light channel, the angle of said light cone being determined by the ratio of the width of each aperture and the distance between said inner and farthermost screens resulting in a light distribution exhibiting a maximum spread over a predetermined angular area.

References Cited in the file of this patent

UNITED STATES PATENTS

| | | |
|---|---|---|
| 1,792,046 | Skaupy | Feb. 10, 1931 |
| 2,102,928 | Van Leunen | Dec. 21, 1937 |
| 2,440,938 | Falge | May 4, 1948 |
| 2,645,976 | Goldsmith | July 21, 1953 |

FOREIGN PATENTS

| | | |
|---|---|---|
| 1,241,659 | France | Aug. 8, 1960 |